(12) United States Patent
Ma et al.

(10) Patent No.: US 9,829,767 B2
(45) Date of Patent: Nov. 28, 2017

(54) WAVELENGTH SELECTIVE SWITCH AND WAVELENGTH SELECTION METHOD

(71) Applicant: HUAWEI TECHNOLOGIES CO.,LTD., Shenzhen, Guangdong (CN)

(72) Inventors: Xiao Ma, Shenzhen (CN); Xuecang Zhang, Hangzhou (CN); Jianyi Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/408,745

(22) Filed: Jan. 18, 2017

(65) Prior Publication Data

US 2017/0123289 A1    May 4, 2017

Related U.S. Application Data

(63) Continuation of application No. PCT/CN2014/082454, filed on Jul. 18, 2014.

(51) Int. Cl.
*G02F 1/295* (2006.01)
*G02F 1/313* (2006.01)
(Continued)

(52) U.S. Cl.
CPC ....... *G02F 1/3133* (2013.01); *G02B 6/29343* (2013.01); *G02B 6/29382* (2013.01);
(Continued)

(58) Field of Classification Search
CPC ............... G02F 1/3133; G02F 1/0147; G02F 2201/063; G02F 2203/15; G02B 6/29343; G02B 6/29382; G02B 6/29395
See application file for complete search history.

(56) References Cited

U.S. PATENT DOCUMENTS 6,839,488 B2 * 1/2005 Gunn, III ............... B82Y 20/00
372/20
7,616,850 B1 * 11/2009 Watts ................. G02B 6/29335
385/2

(Continued)

FOREIGN PATENT DOCUMENTS

CN    101620298 A    1/2010
CN    103487889 A    1/2014

OTHER PUBLICATIONS

Hugo L. R. Lira et al, Broadband hitless silicon electro-optic switch for optical networks on-chip, 2009 IEEE. pp. 253-255.

(Continued)

*Primary Examiner* — Ellen Kim
(74) *Attorney, Agent, or Firm* — Huawei Technologies Co., Ltd.

(57) ABSTRACT

A wavelength selective switch and a wavelength selection method are provided, where the wavelength selective switch includes: a dual-microring resonator, including a first microring and a second microring that are connected in series, where the first microring and the second microring respectively include one annular PN junction, and a direction of the annular PN junction of the first microring is the same as that of the annular PN junction of the second microring; an electric tuning module, where a first electric port of the electric tuning module is connected to a P zone of the first microring and an N zone of the second microring, a second electric port of the electric tuning module is connected to an N zone of the first microring and a P zone of the second microring; and a thermal tuning module, configured to adjust an operating temperature of the dual-microring resonator.

19 Claims, 6 Drawing Sheets

(51) Int. Cl.
*G02B 6/293* (2006.01)
*G02F 1/01* (2006.01)

(52) U.S. Cl.
CPC ....... *G02B 6/29395* (2013.01); *G02F 1/0147* (2013.01); *G02F 2201/063* (2013.01); *G02F 2203/15* (2013.01)

(56) References Cited

U.S. PATENT DOCUMENTS

| | | | |
|---|---|---|---|
| 8,582,937 B2 | 11/2013 | Xu | |
| 9,270,078 B2* | 2/2016 | Rickman | H01S 3/083 |
| 9,438,970 B2* | 9/2016 | Jones | G02B 6/12019 |
| 2009/0263078 A1 | 10/2009 | Hosomi et al. | |
| 2011/0170821 A1 | 7/2011 | Lipson et al. | |
| 2011/0235962 A1* | 9/2011 | Shubin | G02B 6/12007 |
| | | | 385/14 |
| 2012/0081197 A1 | 4/2012 | Park et al. | |
| 2013/0037692 A1 | 2/2013 | Akiyama | |

OTHER PUBLICATIONS

Hiroki Ikehara et al. Hitless wavelength-selective switch based on quantum well second-order series-coupled microring resonators, Optics Express, Mar. 2013. total 14 pages.

Hiroshi Kamiya et al. Hitless wavelength-selective switch with quadruple series-coupled microring resonators using multiple-quantum-well waveguides, Optics Express,vol. 21, No. 18, Sep. 2013. total 14 pages.

V. Magen et al., "Interconnect-power dissipation in a microprocessor," SLIP Feb. 2004. total 7 pages.

Hui Yu et al. Silicon dual-ring modulator driven by differential signal. Optics Letters / vol. 39, No. 22 , Nov. 15, 2014. pp. 6379-6382.

* cited by examiner

An electric tuning module applies bias voltages with reverse directions to an annular PN junction of a first microring and an annular PN junction of a second microring, so that a refractive index of the first microring and that of the second microring reversely change, so that a dual-microring resonator is in a detuned state — S410

A thermal tuning module adjusts an operating temperature of the dual-microring resonator to change a resonant wavelength of the dual-microring resonator — S420

The electric tuning module stops applying the bias voltages with reverse directions to the annular PN junction of the first microring and the annular PN junction of the second microring, so that the dual-microring resonator is in a resonant state at a changed resonant wavelength — S430

FIG. 4

WAVELENGTH SELECTIVE SWITCH AND WAVELENGTH SELECTION METHOD

CROSS-REFERENCE TO RELATED APPLICATIONS

This application is a continuation of International Application No. PCT/CN2014/082454, filed on Jul. 18, 2014, the disclosure of which is hereby incorporated by reference in its entirety.

TECHNICAL FIELD

The present disclosure relates to the field of information and communications technologies, and more specifically, to a wavelength selective switch and a wavelength selection method.

BACKGROUND

A reconfigurable optical add/drop multiplexer is one of core devices in a wavelength division multiplexing optical interconnection system, and a hitless (Hitless) wavelength selective switch is a critical element of the device. A hitless wavelength selective switch in conventional optical communications is mostly based on a switch technology such as a micro-electro-mechanical system (MEMS), has a large volume and a low speed, and is unsuitable to be used for inter-chip and on-chip optical interconnection wavelength division multiplexing networks. An inter-chip, or particularly, on-chip optical interconnection needs a hitless wavelength selective switch that has a small volume and a quick speed, and that is convenient for high-density integration. In addition, a wavelength selective switch based on an InGaAs/InAlAs five-layer asymmetric coupled quantum well second-order or fourth-order series microring structure is incompatible with a silicon-CMOS craft, and a wavelength adjustable range is not large. Therefore, the wavelength selective switch is also unsuitable for a high-density integrated optical interconnection.

SUMMARY

Embodiments of the present disclosure provide a wavelength selective switch and a wavelength selection method that are suitable for a high-density integrated optical interconnection.

A first aspect provides a wavelength selective switch, including a dual-microring resonator, including a first microring and a second microring that are connected in series, where the first microring and the second microring are silicon-based microring waveguides and respectively include one annular PN junction, and a direction of the annular PN junction of the first microring is the same as that of the annular PN junction of the second microring. This also includes an electric tuning module, where a first electric port of the electric tuning module is connected to a P zone of the first microring and an N zone of the second microring, a second electric port of the electric tuning module is connected to an N zone of the first microring and a P zone of the second microring, and the electric tuning module is configured to apply bias voltages with reverse directions respectively to the annular PN junction of the first microring and the annular PN junction of the second microring. Additionally, this aspect includes a thermal tuning module, configured to adjust an operating temperature of the dual-microring resonator.

With reference to the first aspect, in a first possible implementation manner, the electric tuning module is configured to apply the bias voltages with reverse directions respectively to the annular PN junction of the first microring and the annular PN junction of the second microring, so that a refractive index of the first microring and that of the second microring reversely change, so that the dual-microring resonator is in a detuned state; the thermal tuning module is configured to adjust the operating temperature of the dual-microring resonator to change a resonant wavelength of the dual-microring resonator; and the electric tuning module is further configured to stop applying the bias voltages with reverse directions to the annular PN junction of the first microring and the annular PN junction of the second microring, so that the dual-microring resonator is in a resonant state at a changed resonant wavelength.

With reference to the first aspect or the foregoing possible implementation manner of the first aspect, in a second possible implementation manner, the first microring and the second microring are ridge waveguides.

With reference to the first aspect or the foregoing possible implementation manners of the first aspect, in a third possible implementation manner, the thermal tuning module includes a temperature detector, configured to detect a temperature of the dual-microring resonator, a semiconductor refrigerator, configured to change the temperature of the dual-microring resonator, and a control chip, configured to control an operating status of the semiconductor refrigerator according to a detection result of the temperature detector, to adjust the operating temperature of the dual-microring resonator.

With reference to the first aspect or the foregoing possible implementation manners of the first aspect, in a fourth possible implementation manner, parts near microring centers of the first microring and of the second microring are P zones, and parts away from the microring centers are N zones; or parts near microring centers are N zones, and parts away from the microring centers are P zones.

With reference to the first aspect or the foregoing possible implementation manners of the first aspect, in a fifth possible implementation manner, the P zone of the first microring and the P zone of the second microring respectively comprise a P++ zone, and the N zone of the first microring and the N zone of the second microring respectively comprise a N++ zone.

A second aspect provides a method for selecting a wavelength by a wavelength selective switch, where the wavelength selective switch includes a dual-microring resonator, an electric tuning module, and a thermal tuning module, where the dual-microring resonator includes a first microring and a second microring that are connected in series, the first microring and the second microring are silicon-based microring waveguides and respectively include one annular PN junction, a direction of the annular PN junction of the first microring is the same as that of the annular PN junction of the second microring, a first electric port of the electric tuning module is connected to a P zone of the first microring and an N zone of the second microring, and a second electric port of the electric tuning module is connected to an N zone of the first microring and a P zone of the second microring; and the method includes applying, by the electric tuning module, bias voltages with reverse directions respectively to the annular PN junction of the first microring and the annular PN junction of the second microring, so that a refractive index of the first microring and that of the second microring reversely change, so that the dual-microring resonator is in a detuned state, adjusting, by the thermal tuning module, an operating temperature of the dual-microring resonator to change a resonant wavelength of the dual-microring resonator, and stopping, by the electric tuning module, applying the bias voltages with reverse directions to the annular PN junction of the first microring and the annular PN junction of the second microring, so that the dual-microring resonator is in a resonant state at a changed resonant wavelength.

With reference to the second aspect, in a first possible implementation manner, the first microring and the second microring are ridge waveguides.

With reference to the second aspect or the foregoing possible implementation manner of the second aspect, in a second possible implementation manner, the thermal tuning module includes a temperature detector, a semiconductor refrigerator, and a control chip and the adjusting, by the thermal tuning module, an operating temperature of the dual-microring resonator includes controlling, by the control chip, an operating status of the semiconductor refrigerator according to a detection result of the temperature detector, to adjust the operating temperature of the dual-microring resonator.

With reference to the second aspect or the foregoing possible implementation manners of the second aspect, in a third possible implementation manner, parts near microring centers of the first microring and of the second microring are P zones, and parts away from the microring centers are N zones; or parts near microring centers are N zones, and parts away from the microring centers are P zones.

With reference to the second aspect or the foregoing possible implementation manners of the second aspect, in a fourth possible implementation manner, the P zone of the first microring and the P zone of the second microring respectively comprise a P++ zone, and the N zone of the first microring and the N zone of the second microring respectively comprise a N++ zone.

Based on the foregoing technical solutions, according to the wavelength selective switch and the wavelength selection method in the embodiments of the present disclosure, a silicon-based dual-microring resonator is used and can be compatible with a silicon complementary metal-oxide-semiconductor (Complementary Metal Oxide Semiconductor, CMOS) craft; and an electric tuning module and a thermal tuning module collaboratively perform electric tuning and thermal tuning on the dual-microring resonator, which can implement hitless wavelength selection and a large wavelength adjustable range. Therefore, the wavelength selective switch and the wavelength selection method are suitable for a high-density integrated optical interconnection.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
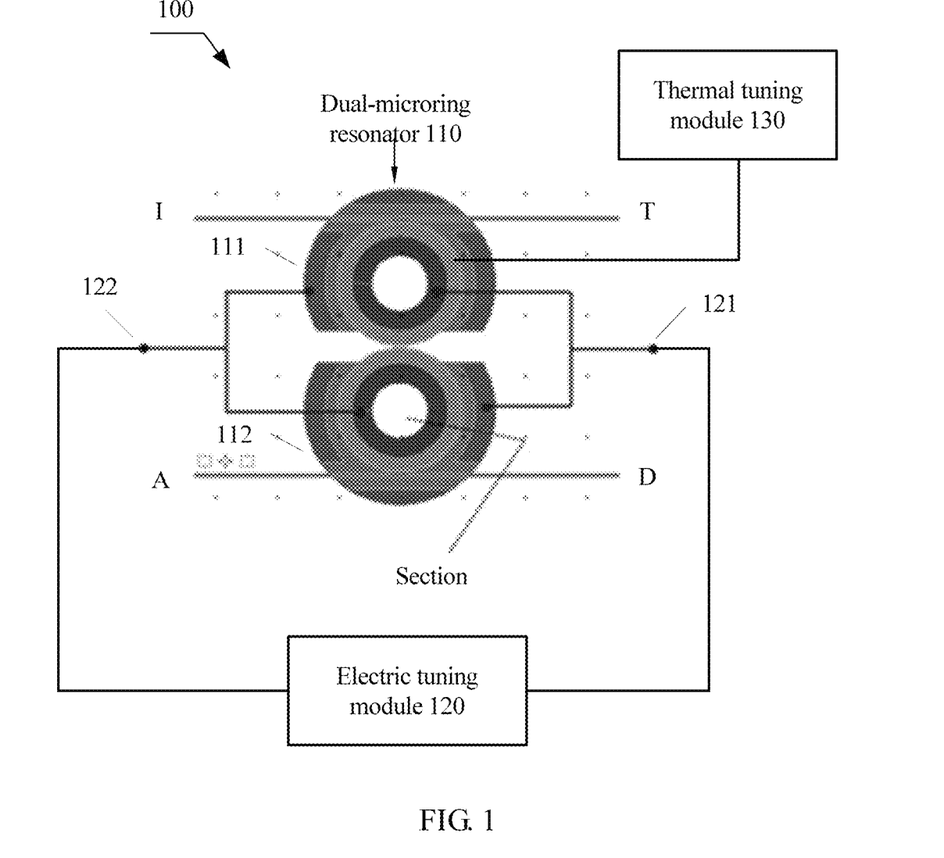
FIG. 1 is a schematic structural diagram of a wavelength selective switch according to an embodiment of the present disclosure.

FIG. 1 shows a schematic structural diagram of a wavelength selective switch 100 according to an embodiment of the present disclosure. As shown in FIG. 1, the wavelength selective switch 100 includes a dual-microring resonator 110, an electric tuning module 120, and a thermal tuning module 130.

The dual-microring resonator 110 includes a first microring 111 and a second microring 112 that are connected in series. That is, the first microring 111 and the second microring 112 are cascaded in a serial connection manner to constitute the dual-microring resonator 110. The first microring 111 and the second microring 112 are silicon-based microring waveguides and respectively include one annular PN junction, and a direction of the annular PN junction of the first microring 111 is the same as that of the annular PN junction of the second microring 112. Specifically, parts near microring centers of the first microring 111 and of the second microring 112 are P zones, and parts away from the microring centers are N zones; or parts near microring centers are N zones, and parts away from the microring centers are P zones. Optionally, the P zone may further include a P++ zone, and the N zone may further include an N++ zone.

Figure 2:
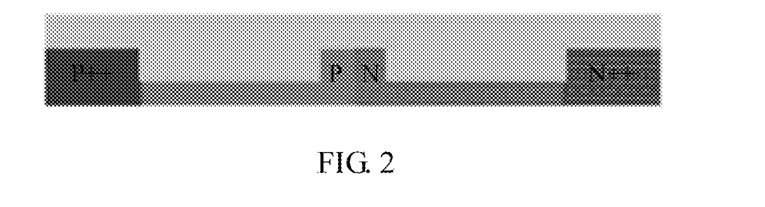
FIG. 2 is a schematic structural diagram of a microring section at a position of a section shown in FIG. 1.

FIG. 2 shows a schematic structural diagram of a microring section at a position of a section shown in FIG. 1. In FIG. 2, a part near a microring center is a P zone, and a part away from the microring center is an N zone. The P zone includes a P++ zone, and the N zone includes an N++ zone. It should be understood that FIG. 2 is merely an example, which shall not constitute any limitation on the protection scope of the present disclosure.

It should be understood that the PN junction in this embodiment of the present disclosure may be changed by a PIN junction, a metal oxide semiconductor (Metal Oxide Semiconductor, MOS) junction, or the like, and the change shall also fall within the protection scope of the present disclosure.

Optionally, in an embodiment of the present disclosure, the first microring 111 and the second microring 112 are ridge waveguides, and for example, may be ridge waveguides shown in FIG. 2.

A first electric port 121 of the electric tuning module 120 is connected to the P zone of the first microring 111 and the N zone of the second microring 112, and a second electric port 122 of the electric tuning module 120 is connected to the N zone of the first microring 111 and the P zone of the second microring 112. The electric tuning module 120 is configured to apply bias voltages with reverse directions to the annular PN junction of the first microring 111 and the annular PN junction of the second microring 112.

When the electric tuning module 120 does not apply voltages, a resonant wavelength of the first microring 111 is the same as that of the second microring 112, and the dual-microring resonator 110 is in a resonant state.

When the bias voltages with reverse directions are applied to the annular PN junction of the first microring 111 of the dual-microring resonator 110 and the annular PN junction of the second microring 112 of the dual-microring resonator 110, a refractive index of the first microring 111 and that of the second microring 112 reversely change. Therefore, a resonant wavelength of the first microring 111 is different from that of the second microring 112, and the dual-microring resonator 110 is in a detuned state.

A PN junction shown in FIG. 2 is used as an example. When the second electric port 122 outputs a positive voltage, and the first electric port 121 outputs a negative voltage, the annular PN junction of the second microring 112 is in a forward bias state, the annular PN junction of the first microring 111 is in a reverse bias state, refractive indexes of the two microrings of the dual-microring resonator 110 reversely change, and further resonant wavelengths are different, thereby achieving the detuned state.

The thermal tuning module 130 is configured to adjust an operating temperature of the dual-microring resonator 110. The thermal tuning module 130 adjusts the operating temperature of the dual-microring resonator 110, so that an entire output spectrum of the dual-microring resonator 110 drifts, so as to change a resonant wavelength of the dual-microring resonator 110. The thermal tuning module 130 may further be configured to maintain the operating temperature of the dual-microring resonator 110 to resist impact of an ambient temperature change.

Optionally, the thermal tuning module 130 may include a temperature detector, a semiconductor refrigerator, and a control chip. The temperature detector is configured to detect a temperature of the dual-microring resonator 110. The semiconductor refrigerator is configured to change the temperature of the dual-microring resonator 110. The control chip is configured to control an operating status of the semiconductor refrigerator according to a detection result of the temperature detector, to adjust the operating temperature of the dual-microring resonator 110.

It should be understood that the thermal tuning module 130 may include another temperature adjustment device. For example, the temperature of the dual-microring resonator 110 may be changed by using a thermocouple.

Optionally, in an embodiment of the present disclosure, the electric tuning module 120 is configured to apply the bias voltages with reverse directions to the annular PN junction of the first microring 111 and the annular PN junction of the second microring 112, so that a refractive index of the first microring 111 and that of the second microring 112 reversely change, and the dual-microring resonator 110 is in a detuned state.

The thermal tuning module 130 is configured to adjust the operating temperature of the dual-microring resonator 110 to change a resonant wavelength of the dual-microring resonator 110.

The electric tuning module 120 is further configured to stop applying the bias voltages with reverse directions to the annular PN junction of the first microring 111 and the annular PN junction of the second microring 112, so that the dual-microring resonator 110 is in a resonant state at a changed resonant wavelength.

Figure 3A:
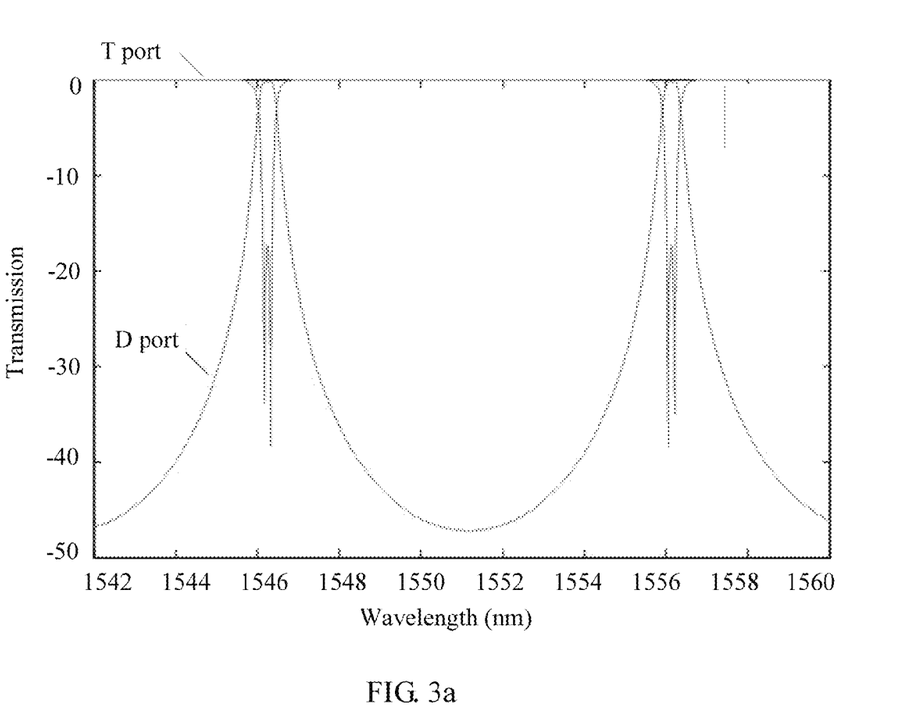
FIG. 3a to FIG. 3d are diagrams of an output spectrum of a dual-microring resonator according to an embodiment of the present disclosure.
Figure 3B:
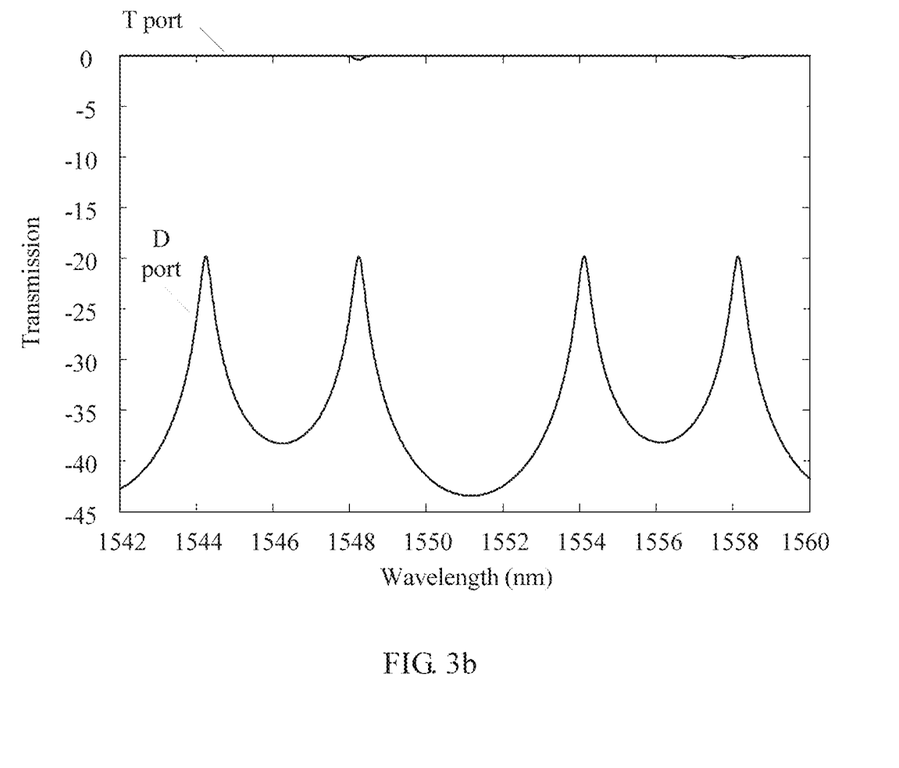
Figure 3C:
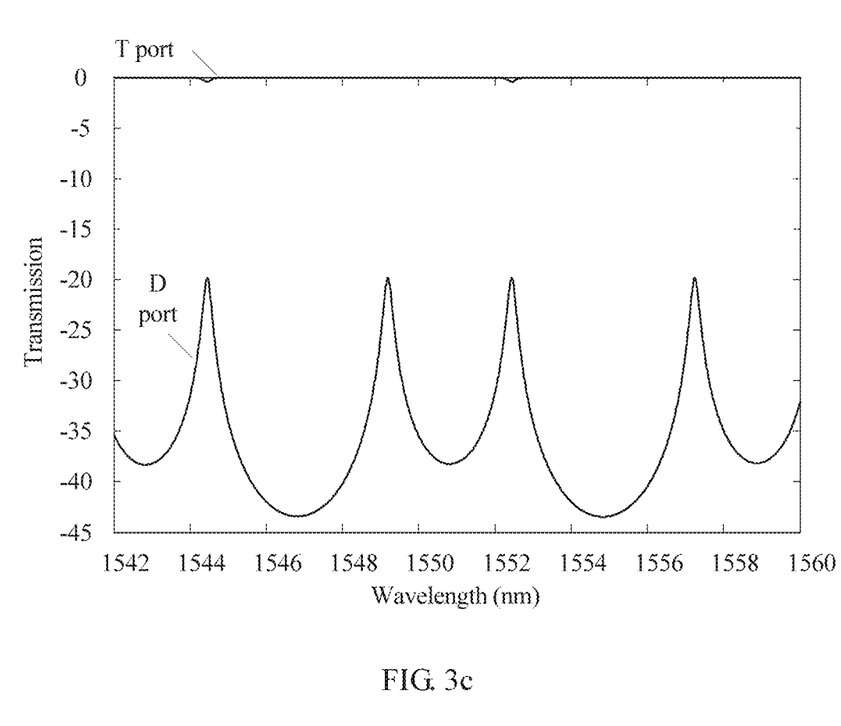
Figure 3D:
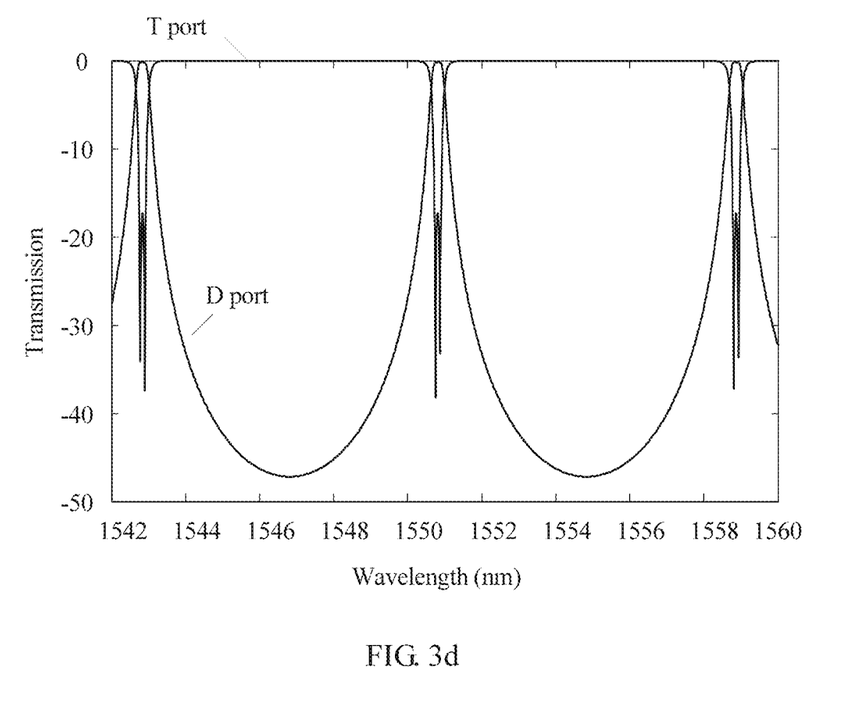

Specifically, when the electric tuning module 120 does not apply voltages, a resonant wavelength of the first microring 111 is the same as that of the second microring 112, and the dual-microring resonator 110 is in a resonant state. In this case, an output spectrum of the dual-microring resonator 110 is shown in FIG. 3a, and the dual-microring resonator 110 resonates at wavelengths of approximately 1546 nm and 1556 nm. When another wavelength needs to be selected, the electric tuning module 120 applies the bias voltages with reverse directions to the annular PN junction of the first microring 111 and the annular PN junction of the second microring 112, the refractive index of the first microring 111 and that of the second microring 112 reversely change, the resonant wavelengths are different, and the dual-microring resonator 110 is in the detuned state. In this case, an output spectrum of the dual-microring resonator 110 is shown in FIG. 3b, and the dual-microring resonator 110 no longer resonates at the wavelengths of approximately 1546 nm and 1556 nm and is in the detuned state. Then, the thermal tuning module 130 adjusts the operating temperature of the dual-microring resonator 110, so that the entire output spectrum of the dual-microring resonator 110 drifts, so as to change the resonant wavelength of the dual-microring resonator 110. That is, the operating temperature of the dual-microring resonator 110 is adjusted to reach a condition for the dual-microring resonator 110 to resonate at an expected new resonant wavelength. As shown in FIG. 3c, an entire output spectrum of the dual-microring resonator 110 drifts, and expected new resonant wavelengths are approximately 1543 nm, 1551 nm, and 1559 nm. Then, the electric tuning module 120 no longer applies voltages, that is, the electric tuning module 120 stops applying the bias voltages with reverse directions to the annular PN junction of the first microring 111 and the annular PN junction of the second microring 112. In this case, the dual-microring resonator 110 is in the resonant state at a changed resonant wavelength (that is, the expected new resonant wavelength). As shown in FIG. 3d, after the electric tuning module 120 stops applying the voltages, the dual-microring resonator 110 resonates at wavelengths of approximately 1543 nm, 1551 nm, and 1559 nm. In this way, hitless wavelength selection may be implemented by means of state changes of the dual-microring resonator from resonant to detuned and then to resonant.

It should be understood that the first microring 111 and the second microring 112 in this embodiment of the present disclosure may be simultaneously replaced by structures with an even number of serial microrings. For example, the first microring 111 is replaced by two microrings, and the second microring 112 is replaced by four microrings. The replacements shall also fall within the protection scope of the present disclosure.

In this embodiment of the present disclosure, an annular PN junction is used to implement waveguide refractive index modulation of a microring. In this way, when a carrier in a waveguide core area is extracted by using bias voltages with reverse directions to change a waveguide refractive index, no conductive current is generated. Therefore, no heat is generated to damage a hitless characteristic of an entire device. In other words, a reverse modulation manner of the PN junction enables the hitless characteristic to be maintained for a long time. In addition, a larger wavelength adjustable range can be obtained by changing a resonant wavelength by means of thermal tuning. Therefore, the wavelength selective switch in this embodiment of the present disclosure has relatively good performance in aspects of both a wavelength adjustable range and tuning time.

The wavelength selective switch in this embodiment of the present disclosure uses a silicon-based dual-microring resonator, may be compatible with a silicon CMOS craft, and has a small volume and a quick speed; and an electric tuning module and a thermal tuning module collaboratively perform electric tuning and thermal tuning on the dual-microring resonator, which can implement hitless wavelength selection and a large wavelength adjustable range. Therefore, the wavelength selective switch in this embodiment of the present disclosure is suitable for a high-density integrated optical interconnection.

The foregoing describes in detail the wavelength selective switch in the embodiments of the present disclosure, and the following describes a method for selecting a wavelength by the wavelength selective switch in the embodiments of the present disclosure.

Figure 4:
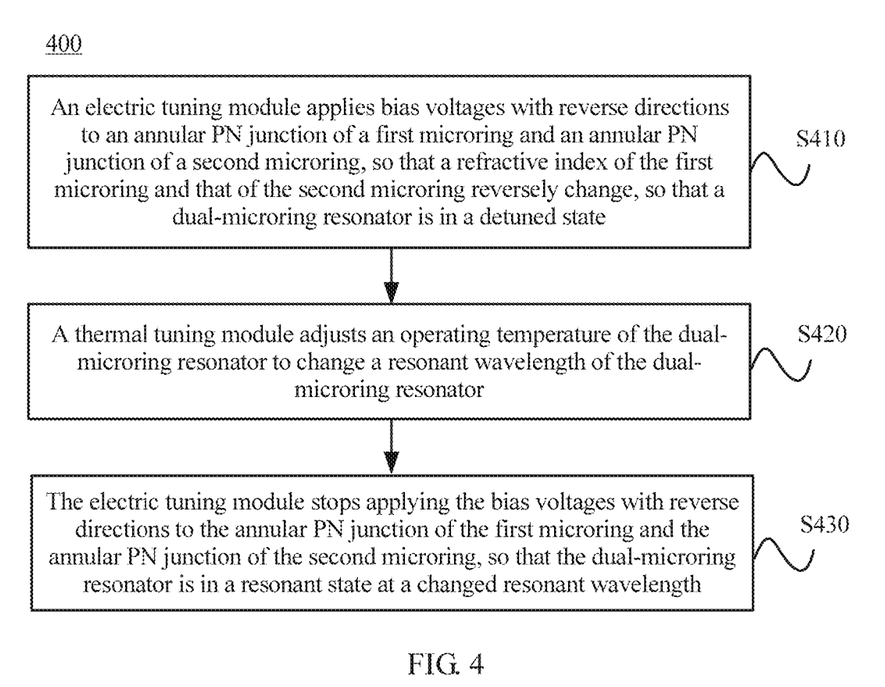
FIG. 4 is a schematic flowchart of a wavelength selection method according to an embodiment of the present disclosure.

FIG. 4 shows a schematic flowchart of a method 400 for selecting a wavelength by a wavelength selective switch according to an embodiment of the present disclosure. The wavelength selective switch is the wavelength selective switch 100 in the embodiments of the present disclosure. As shown in FIG. 4, the method 400 includes the following steps:

S410. An electric tuning module applies bias voltages with reverse directions to an annular PN junction of a first microring and an annular PN junction of a second microring, so that a refractive index of the first microring and that of the second microring reversely change, so that a dual-microring resonator is in a detuned state.

S420. A thermal tuning module adjusts an operating temperature of the dual-microring resonator to change a resonant wavelength of the dual-microring resonator.

S430. The electric tuning module stops applying the bias voltages with reverse directions to the annular PN junction of the first microring and the annular PN junction of the second microring, so that the dual-microring resonator is in a resonant state at a changed resonant wavelength.

In this embodiment of the present disclosure, optionally, if the thermal tuning module includes a temperature detector, a semiconductor refrigerator, and a control chip, the adjusting, by the thermal tuning module, an operating temperature of the dual-microring resonator includes controlling, by the control chip, an operating status of the semiconductor refrigerator according to a detection result of the temperature detector, to adjust the operating temperature of the dual-microring resonator.

Procedures according to the wavelength selection method 400 of this embodiment of the present disclosure may be executed and implemented respectively by corresponding components in the wavelength selective switch 100 according to the embodiment of the present disclosure. For brevity, details are not described herein.

According to the wavelength selection method in this embodiment of the present disclosure, an electric tuning module and a thermal tuning module collaboratively perform electric tuning and thermal tuning on a silicon-based dual-microring resonator, which can implement hitless wavelength selection.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a corresponding process in the foregoing method embodiment, reference may be made to a detailed working process of the foregoing apparatus, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wavelength selective switch, comprising:
a dual-microring resonator, comprising a first microring and a second microring, wherein the first microring and the second microring respectively comprise one annular PN junction;
an electric tuning module, wherein a first electric port of the electric tuning module is connected to a P zone of the first microring and an N zone of the second microring, a second electric port of the electric tuning module is connected to an N zone of the first microring and a P zone of the second microring, and the electric tuning module is configured to apply bias voltages with reverse directions respectively to the annular PN junction of the first microring and the annular PN junction of the second microring; and
a thermal tuning module, configured to adjust an operating temperature of the dual-microring resonator.

2. The wavelength selective switch according to claim 1, wherein the electric tuning module is configured to apply the bias voltages with reverse directions respectively to the annular PN junction of the first microring and the annular PN junction of the second microring, so that a refractive index of the first microring and that of the second microring reversely change, so that the dual-microring resonator is in a detuned state;
the thermal tuning module is configured to adjust the operating temperature of the dual-microring resonator to change a resonant wavelength of the dual-microring resonator; and
the electric tuning module is further configured to stop applying the bias voltages with reverse directions to the annular PN junction of the first microring and the annular PN junction of the second microring, so that the dual-microring resonator is in a resonant state at a changed resonant wavelength.

3. The wavelength selective switch according to claim 1, wherein the first microring and the second microring are ridge waveguides.

4. The wavelength selective switch according to claim 1, wherein the thermal tuning module comprises:
a temperature detector, configured to detect a temperature of the dual-microring resonator;
a semiconductor refrigerator, configured to change the temperature of the dual-microring resonator; and
a control chip, configured to control an operating status of the semiconductor refrigerator according to a detection result of the temperature detector, to adjust the operating temperature of the dual-microring resonator.

5. The wavelength selective switch according to claim 1, wherein parts near microring centers of the first microring and of the second microring are P zones, and parts away from the microring centers are N zones.

6. The wavelength selective switch according to claim 1, wherein parts near microring centers of the first microring and of the second microring are N zones, and parts away from the microring centers are P zones.

7. The wavelength selective switch according to claim 1, wherein the P zone of the first microring and the P zone of the second microring respectively comprise a P++ zone.

8. The wavelength selective switch according to claim 1, wherein the N zone of the first microring and the N zone of the second microring respectively comprise a N++ zone.

9. A method for selecting a wavelength by a wavelength selective switch, wherein the wavelength selective switch comprises a dual-microring resonator, an electric tuning module, and a thermal tuning module, wherein the dual-microring resonator comprises a first microring and a second microring, the first microring and the second microring respectively comprise one annular PN junction, a first electric port of the electric tuning module is connected to a P zone of the first microring and an N zone of the second microring, and a second electric port of the electric tuning module is connected to an N zone of the first microring and a P zone of the second microring; and
the method comprises:
applying, by the electric tuning module, bias voltages with reverse directions respectively to the annular PN junction of the first microring and the annular PN junction of the second microring, so that a refractive index of the first microring and that of the second microring reversely change, so that the dual-microring resonator is in a detuned state;
adjusting, by the thermal tuning module, an operating temperature of the dual-microring resonator to change a resonant wavelength of the dual-microring resonator; and
stopping, by the electric tuning module, applying the bias voltages with reverse directions to the annular PN junction of the first microring and the annular PN junction of the second microring, so that the dual-microring resonator is in a resonant state at a changed resonant wavelength.

10. The method according to claim 9, wherein the first microring and the second microring are ridge waveguides.

11. The method according to claim 9, wherein the thermal tuning module comprises a temperature detector, a semiconductor refrigerator, and a control chip; and
the adjusting, by the thermal tuning module, an operating temperature of the dual-microring resonator comprises:
controlling, by the control chip, an operating status of the semiconductor refrigerator according to a detection result of the temperature detector, to adjust the operating temperature of the dual-microring resonator.

12. The method according to claim 9, wherein parts near microring centers of the first microring and of the second microring are P zones, and parts away from the microring centers are N zones.

13. The method according to claim 9, wherein parts near microring centers of the first microring and of the second microring are N zones, and parts away from the microring centers are P zones.

14. The method according to claim 9, wherein the P zone of the first microring and the P zone of the second microring respectively comprise a P++ zone.

15. The method according to claim 9, wherein the N zone of the first microring and the N zone of the second microring respectively comprise a N++ zone.

16. A method, comprising:
applying, by an electric tuning module, bias voltages with reverse directions respectively to an annular PN junction of a first microring and an annular PN junction of a second microring, so that a refractive index of the first microring and that of the second microring reversely change, so a the dual-microring resonator is in a detuned state;

adjusting, by a thermal tuning module, an operating temperature of the dual-microring resonator to change a resonant wavelength of the dual-microring resonator; and stopping, by the electric tuning module, applying the bias voltages with reverse directions to the annular PN junction of the first microring and the annular PN junction of the second microring, so that the dual-microring resonator is in a resonant state at a changed resonant wavelength.

17. The method according to claim 16, wherein the first microring and the second microring are ridge waveguides.

18. The method according to claim 16, wherein parts near microring centers of the first microring and of the second microring are P zones, and parts away from the microring centers are N zones.

19. The method according to claim 16, wherein parts near microring centers of the first microring and of the second microring are N zones, and parts away from the microring centers are P zones.

* * * * *